United States Patent [19]

Moore

[11] 4,171,333

[45] Oct. 16, 1979

[54] TOWER PACKING SUPPORT

[75] Inventor: Frank D. Moore, Tallmadge, Ohio

[73] Assignee: Norton Company, Worcester, Mass.

[21] Appl. No.: 890,391

[22] Filed: Mar. 27, 1978

Related U.S. Application Data

[63] Continuation-in-part of Ser. No. 797,489, May 16, 1977, abandoned.

[51] Int. Cl.² ............................................. B01F 3/04
[52] U.S. Cl. ...................................... 261/94; 261/113
[58] Field of Search .................................. 261/94–98, 261/109, 110, 113, 114 JP, DIG. 72; 202/158

[56] References Cited

U.S. PATENT DOCUMENTS

| 641,684 | 1/1900 | Ferry ................................ 261/113 X |
| 3,222,040 | 12/1965 | Eckert .............................. 261/113 X |
| 3,325,155 | 6/1967 | Bahout .................................. 261/113 |
| 3,396,515 | 8/1968 | Wright ............................. 261/113 X |
| 3,419,253 | 12/1968 | Eckert ................................ 261/97 X |
| 3,937,769 | 2/1976 | Strigle, Jr. et al. ..................... 261/97 |

FOREIGN PATENT DOCUMENTS 633433  7/1936  Fed. Rep. of Germany ........... 261/113

OTHER PUBLICATIONS

Norton, Design Manual TA-70, "Packed Tower Internals", Akron, Oh., Copyright 1960.

Primary Examiner—Richard L. Chiesa
Attorney, Agent, or Firm—Walter Fred

[57] ABSTRACT

A fluid injection packing support with improved directional fluid flow characteristics, increased strength, rigidity and load carrying capacity includes a plurality of adjoining elongated hollow sections extending across a tower chamber and supported at opposite ends by a ledge fixed to the wall around the chamber. Each section has a spaced pair of inclined sidewalls diverging downwardly from an upper arched top wall portion to adjacent horizontal wall portions extending to adjoining short vertical wall portions. The inclined and horizontal wall portions have apertures with smoothly curved entrances and raised flange portions extending around and projecting to more sharply defined exit ends of the apertures which not only strengthens the wall and section but provides low resistance to the entrance and flow of the counter flowing fluids in one direction and greater resistance to the entrance and flow of the counter flowing fluids from the opposite exit ends of the apertures. Thus, the greatest part of the upwardly and downwardly moving fluids pass through separate apertures with little resistance which reduces the pressure drop across the packing support.

2 Claims, 4 Drawing Figures

TOWER PACKING SUPPORT

CROSS REFERENCE TO RELATED APPLICATIONS

This application is a continuation-in-part of application Ser. No. 797,489 filed May 16, 1977 now abandoned.

BACKGROUND OF THE INVENTION

1. Field of the Invention

The invention relates to a perforated support plate for supporting and injecting fluids into a bed of packing elements in treatment towers or vessels and particularly for a gas-liquid contact apparatus.

2. Description of the Prior Art

Various support systems and plates are known for supporting beds of packing elements in fluid-fluid, liquid-liquid and gas-liquid contact apparatus or towers. Such apparatus being towers designed to bring two counter flowing mediums in contact to effect a specific treatment such as transfer of heat from one to the other.

Present packing support systems utilize sections with vertical or inclined and horizontal perforated portions in the general configuration of a beam to support packing. The essentially vertical portion will pass the upward flowing gas and is in the upper portion of the beam. The perforated horizontal or essentially horizontal portion will pass the liquid phase which flows downward and is in the lower section of the beam. By having the liquid and gas separate and pass different openings the pressure drop across the support system is reduced compared with support systems where the liquid and gas pass common openings in a counter current direction. The present systems have three general limitations.

First: The physical load from packing may be limited by the vertical or inclined perforated wall portion. If this portion is overloaded the side panels or walls will deflect inward and cause failure either structurally or from a flow handling characteristic or both.

Secondly: Around the perforated openings are relatively sharp edges which cause resistance to entrance and flow through the openings. This adds to the gas phase pressure loss of the support system.

Thirdly: The perforated vertical portion of the beam which must shed the down-coming liquid and allow the openings to remain free for the up-coming gas to pass through have essentially flat surfaces and the gas flow must keep the liquid from entering the perforations. Thus, some pressure must be lost by the gas to keep liquid from entering the perforations. This adds to the gas phase pressure loss of the support system.

The present invention greatly improves on all three of these limitations by smoothly flaring and raising the edge of the material around the perforated openings. This will add ribs and rigidity to the side panels to prevent inward deflections. Each entrance to the openings is smoothly rounded which reduces the resistance to flow, or in effect provides a higher orifice coefficient. Exits of the openings with relatively sharp edges are beyond the side panel and the down-coming liquid will be mostly restricted from entering from the exit of the opening and thereby decreases the resistance to the gas flow.

U.S. Pat. Nos. 3,222,040 and 3,419,253 granted to John S. Eckert and assigned to the assignee of this application and Design Manual TA-70 entitled, Packed Tower Internals published by Norton Chemical Process Products Division, Akron, Ohio 44309, copyright 1970 disclose packing support plates similar in many respects to and of the type with which the instant invention concerns itself.

However, this invention is an improvement over comparable prior art perforated support plates known to the applicant and differ therefrom in that the apertures providing the free or open space in the walls thereof have around them smoothly curved entrances and projecting rims or wall portions which improves directional flow characteristics of the counter flowing mediums, lowers the resistance to flow and thereby reduces the pressure drop across the support system. Also, the walls in each section of the support are strengthened by the projecting rims and have, depending on rim size, up to eight (8) times more resistance to bending or deflection than nonrimmed apertured walls of a comparable support section of identical size, shape and amount of free or open space. Hence, the support plate assembly has a much greater load supporting capacity in cases where the walls are limiting.

SUMMARY OF THE INVENTION

A tower packing perforated support plate comprising a plurality of adjacent elongated hollow section or beams each of which is adapted to be inserted through a manway in the wall of the tower. The sections extend beside one another across a chamber within the tower and are supported at opposite ends by a support, ledge or ring fixed to the wall around the chamber. The tower chamber can be of any configuration in cross-section and up to 12 feet (3.658 m) or more in diameter or width. Hence the support plate may include a relatively longer middle section which receives no side support and there may be as many as 12 or more adjoining or adjacent sections supported at their ends. As a result the middle section may have to carry a load of 5 tons or more of the packing elements situated above the support plate.

Each section of the support plate has an upper elongated vertically extending portion with a chamber between spaced perforated sidewalls. Preferably the sidewalls are inclined and diverge downwardly from an arched top surface to lower adjoining perforated horizontal wall portions extending to short vertical wall portions abutting or slightly spaced from adjacent sections of the support plate. Extending around apertures or perforations in the inclined and horizontal wall portions are raised flanges or walls which project beyond adjacent surfaces of the wall portions to the exit ends of the apertures.

Resistance to entrance and flow of counter flowing mediums through the apertures is greatly reduced by smoothly curved entrance portions while the resistance to the entrance and flow of the counter flowing mediums from the opposite exit ends is greatly increased by the projecting walls or rims and sharper edge surfaces at the exit ends of the apertures. Hence, the pressure drop in the packing support system is greatly reduced.

In addition, the raised walls or flanges around the apertures increases the resistance to bending, distortion and deflection of the wall portions and thereby strengthens and increases the load bearing capacity of the sections and hence the packing support plate.

Therefore, the primary object of the invention is to provide an improved perforated tower packing support of greater strength, lower resistance to entrance and flow of the counter flowing medium in one direction through separate groups of apertures and greater resistance to entrance and simultaneous flow of the counterflow mediums through the same apertures.

DESCRIPTION OF THE PREFERRED EMBODIMENT(S)

Figure 1:
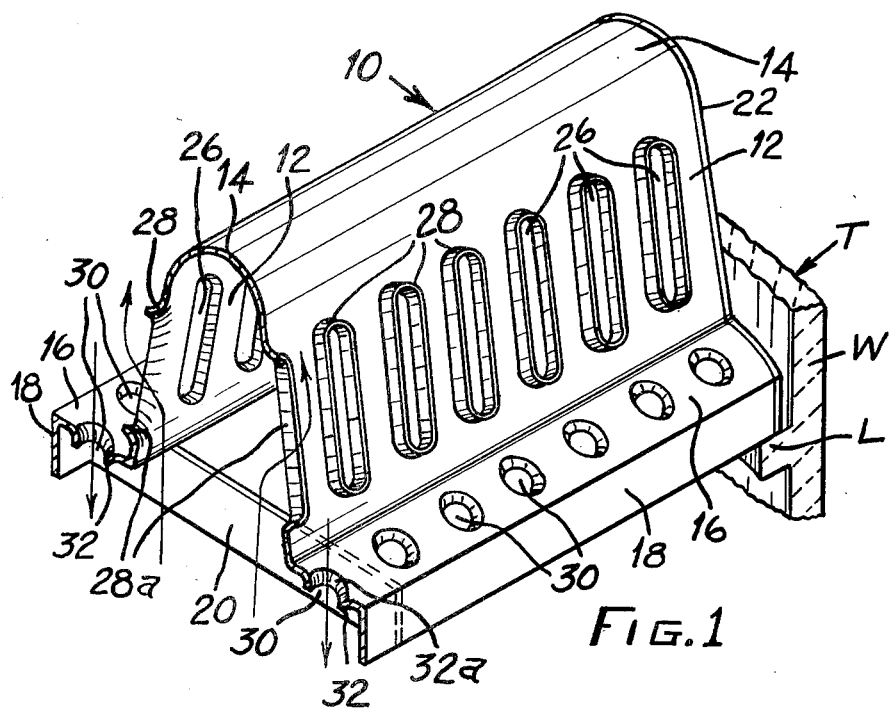
FIG. 1 is a perspective view showing a portion and cross-sectional configurations of one of the plurality of adjoining elongated packing support sections in the packing support plate.
Figure 2:
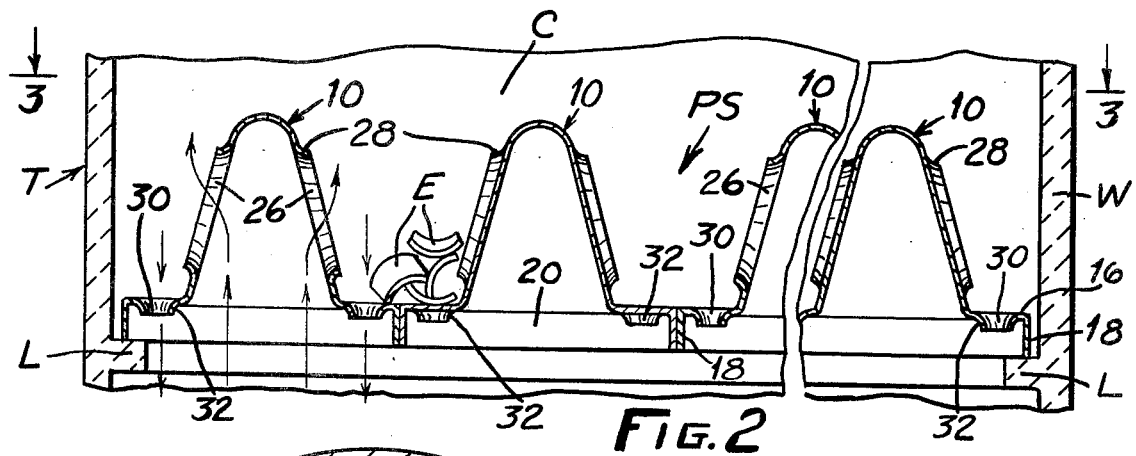
FIG. 2 is a vertical cross-section view through a portion of a tower taken on line 2—2 of FIG. 3 showing a support plate comprised of a plurality the sections shown in FIG. 1 extending horizontally across the chamber and supported by a ledge on the tower wall.
Figure 3:
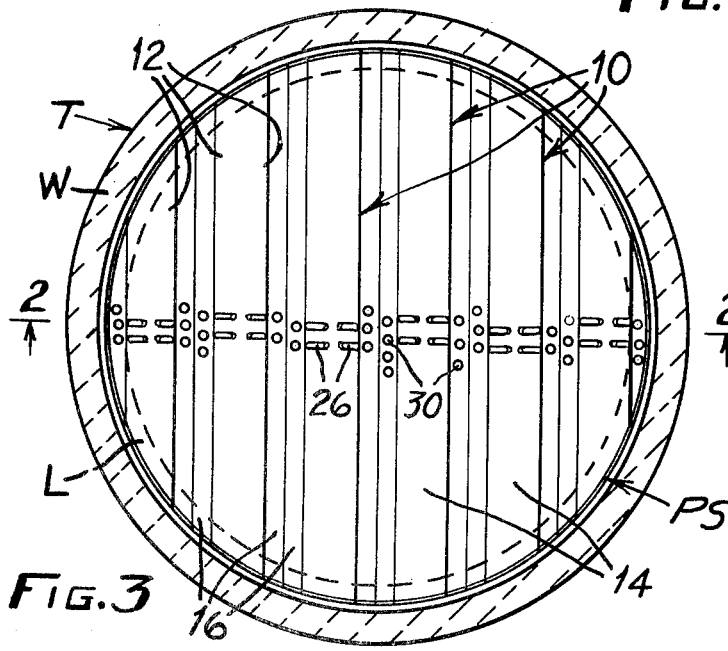
FIG. 3 is a cross-section through the tower taken on line 3—3 of FIG. 2 showing a top view of the support plate shown in FIG. 2.
Figure 4:
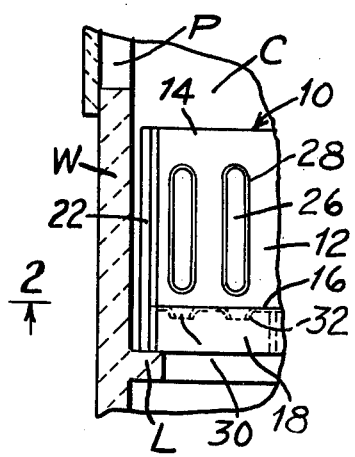
FIG. 4 is a vertical cross-sectional view through a portion of the tower walls showing an end portion of an elongated section supported by the ledge and part of the manway in the tower wall.

Referring to FIGS. 1, 2 and 3 the fluid injection packing support PS of the instant invention comprises a plurality of adjoining elongated hollow packing support sections or members 10 of substantially identical cross-sectional configuration. Preferably the sections 10 are arranged side by side, either slightly spaced or in abutting relationship to each other, extend longitudinally across the chamber C and supported at opposite ends by a ring or ledge L extending around the chamber C and fixed to the wall W of the tower T. In the tower wall W adjacent the ledge is the usual manway or passage P, partly shown in FIG. 4, through which the sections 10 are passed and then assembled on the supporting ledge L.

Each elongated section or beam 10 is preferably a single unitized structure which can be fabricated or molded of various materials such as metals, plastics and ceramics. It also can be made in two or more parts fixed together as by welding, or with other suitable fasteners such as bolts, screws, and adhesives.

As shown by example in FIG. 3, the packing support PS is situated within a circular tower chamber and is, therefore, of circular configuration which may not always be the case. Hence, the circular packing support PS has a plurality of elongated sections 10 which vary in length from the longest nearest the center of the chamber to the shortest at opposite sides of the chamber.

It is obvious that the longest center section 10 supported only at its opposite ends has the greatest span and must therefore be rigidly constructed and strong enough to support a greater portion of the bed of packing elements E.

In cross-section, each of the elongated hollow sections, members or beams 10 has as shown in FIGS. 1 and 2 an upper portion including a spaced pair of inclined or tapered perforated sidewalls 12 which diverge downwardly from a connecting upper top portion 14 preferably in the form of an arch. The spaced sidewalls 12 extend downwardly, typically at a predetermined relatively steep angle of 0° to 35° from the vertical to a pair of adjoining horizontal perforated wall portions 16 in the lower portion of the beam or member 10. The horizontal wall portions 16 extend to and are joined to spaced relatively short vertical imperforate sidewall or side portions 18 extending downwardly from the horizontal wall portions 16.

Extending between the spaced vertical sidewalls or flanges 18 are cross braces 20 situated at spaced intervals between the ends of each section 10. The braces maintain the spacing of the walls 18, rigidify and prevent the sections 10 from becoming distorted.

An end cap, wall or closure 22 is fixed to each opposite end of a section 10 to prevent packing elements from passing the opposite ends of the section. In most instances, where the chamber C and packing support plate PS are circular, the opposite ends of the sections 10 and end caps 22 are arcuately shaped to fit within and conform to the curvature of the chamber wall W. However, in some instances the end caps 22 can be eliminated when packing elements are sufficiently large and could not pass the opening between the ends of the sections and chamber wall.

Alternatively, the sections 10 may have straight flat beveled end walls or caps situated at a suitable angle or parallel to the tower wall whereupon at least the entire lower surface edge of the end cap engages the ledge. The end wall or cap 22 could be placed at an angle which lies on a plane representing the chord of a corresponding arc of curvature of the adjacent chamber wall.

A plurality of elongated apertures 26 are provided in the diverging inclined walls 12 of each section 10 for the passage and injection of an upwardly flowing fluid, such as a gas, into the bed of the packing elements E.

Extending preferably around each of the apertures or slots 26 is a continuous primary flange, rim, rib or wall portion 28 projecting a predetermined distance beyond the outer surface of the inclined walls 12. Each aperture 26 has around it a relatively smooth inner peripheral surface 28a of the flange or rib 28 which extends from a smoothly curved entrance portion at the inner surface of the inclined wall 12 to a more sharply defined inclined exit end surface of the raised wall or flange 28.

As shown, the elongated apertures 26 and raised walls 28 there around extend longitudinally along the relatively flat inclined walls between the point of tangency with the arched top surface 14 and intersection with the horizontal wall portions 18.

Also, the elongated slots 26 in one inclined wall 12 may be either aligned with or staggered relative to the slots 26 in the opposite inclined wall 12 or the inclined wall of an adjacent member or section 10.

Alternatively, the inclined walls 12 may have a plurality of rimmed apertures of smaller or larger size and of any known geometric configuration.

It can be seen that a fluid such as a gas flowing upwardly and directed into the internal chamber between the inclined walls 12 can easily enter the smoothly curved entrances of the apertures 26 and pass therethrough into the bed of packing elements E. On the other hand a fluid such as a liquid flowing downwardly finds it more difficult to enter the sharper exit ends of the apertures because in addition to the resistance provided by the up-flowing gas, the raised rims or flanges 28 project into and sheds the down-coming liquid away from the exit ends. Further, the exits of the apertures 26 are usually narrower than the smoothly curved entrances and the exit ends of the rims 28 have more sharply defined end surfaces and edges to resist entrance of the down-coming fluid.

Similarly, the horizontal wall portions 16 of the sections 10 have preferably a plurality of longitudinally spaced rimmed openings or apertures 30. Extending preferably around each opening 30 is a continuous secondary rim, flange or wall portion 32 which projects downwardly a predetermined short distance from the underside or lower surface of the horizontal wall portion 16. The rimmed apertures 30 have around each of them a relatively smooth inner peripheral surface 32a of the rim 32 which extends from a smoothly curved entrance at the top surface of the substantially horizontal wall 16 to a more sharply defined exit end surface projecting below the adjacent surface or underside of the wall 16.

Although the openings 30 shown, by example, are of circular configurations they may be elongated or of any other geometric configuration. Also, they may be of larger or smaller size, vary in number, be either staggered or aligned relative to each other or to the elongated apertures or slots 26.

The smoothly curved entrance portions of the apertures 30 lowers the resistance to entrance and flow of the down-coming fluid through the packing support plate PS from a bed of packing element E supported thereon. In contrast, the sharply defined exit end surfaces or edges and the outer peripheral surfaces of the projected rims or walls 32 increases the resistance to the entrance and passage of the counter up-flowing fluid from the exit ends over and above the resistance provided by the flow of the down-coming fluid through the openings 30.

Depending on the specific requirements including the type of packing to be supported and use, the size and shape of the sections 10 and the support plate PS; the amount of free space provided by the apertures 26 and 30; the degree of curvature at the entrances of the apertures as well as the amount the walls or flanges 28 and 32 projects beyond the walls 12 and 16 and the inclination of the walls 12 can be varied to suit and obtain the desired load supporting strength and results from the apparatus.

Thus, in operation the packing support plate of the invention is more effective in separating and directing the counter flowing fluids to flow through separate openings, lowers the resistance to entrance and flow of the fluids through the openings in one direction and increases the resistance to the entrance and simultaneous flow of the counter flowing fluids through the same openings in the support plate. As a result the pressure drop across the packing support system is greatly reduced.

A multibeam packing support plate of the invention can be made of various materials to fit within tower chambers of various sizes and configurations by fabricating a number of substantially identical sections of proper length with flanged apertures therein and assembling them side by side on the supporting means provided in the tower chamber. With the exception of the flanges about the apertures, the sections of the invention are generally comparable in height, width, length, material, shape and amount of free or open space to similar sections used in fabricating comparable prior art support plates such as disclosed in the above mentioned prior art references.

Obviously, plastic and ceramic sections are molded to form in the well known manner while metal sections are fabricated in the usual manner from sheet metal of the desired type. When the sections are molded, the integral flanges around the apertures can be made to project any suitable desired amount regardless of the size and spacing of the apertures.

However, when fabricated from an integral sheet of metal, the desired width or diameter and spacing of the openings or apertures usually determines the maximum amount of metal available about the axis or on opposite sides of the center of the openings which can be flared out and the maximum height of the flanges. Alternatively, the metal flanges or rims of any suitable height could be made separately and fastened, as by welding around the apertures of any size in a separately formed section.

Preferably, the metal sections are fabricated from an integral sheet of metal which is pierced or slitted at the center or a predetermined distance along the center of the desired aperture in order to utilize all of the metal available, obtain flanges of maximum height and walls of maximum rigidity. However, the flange height can be reduced to a height less than the maximum obtainable from an aperture of specific size by removing or cutting away a portion thereof in any suitable manner. A portion of the metal can be removed prior to flaring by punching therein a smaller aperture of substantially the same configuration and proportionally smaller in size than the final size of the desired aperture.

Typically, the flanges about the apertures 26 and 30 project about 0.340 inches (8.64 mm) beyond the adjacent wall surface and the radius of curvature of the smoothly curved inner peripheral surfaces 28a and 32a at the entrance to each aperture 26 and 30 is approximately 0.3125 inches (7.87 mm).

Fabrication of a typical metal section or beam 10 is preferably done by dieing or stamping out and bending with conventional metal working tools and apparatus a single piece of sheet metal of predetermined width, length and wall thickness, typically about 0.0625 inches (1.587 mm) thick.

The apertures 26 and 30 and flanges 28 and 32 around them may be formed by punching, drawing and flaring the material to the desired curvature or radius, height and size about the openings.

The punched, drawn and flared sheet of metal is then bent at opposite sides to form the horizontal and vertical walls 16 and 18 and at the center to form the arch 14 and inclined wall portions 12 to the desired configuration and dimensions. The braces 20 of strip metal cut to length are then welded in place between the vertical walls 18 at predetermined intervals, preferably in between the apertures 26 and 30.

End caps 22 and the ends of the section are arcuately formed and welded together to fit within and closely conform to the curvature of the chamber wall and engage the supporting ledge L.

With respect to defining the flanges the word "around" used herein is to be interpreted to mean flanges or rims extending partially as well as completely around the apertures and openings in the sections.

Although a specific embodiment of the invention has been disclosed herein above, it is obvious that other embodiments and modifications thereof are possible that fall within the teachings of the invention. For example a multibeam support with flanged apertures may be, depending on its size, a single unitary multibeam structure or a composite structure comprised of a plurality of integral multibeam sections. Each integral multibeam section having at least two elongated beams therein.

Alternatively, flanges or rims may be provided either around only the apertures 26 in the inclined walls and not about the openings 30 or around only the apertures 30 and not about the apertures 26. Also, the flanges may extend around some but not all of the apertures 26 and openings 30 and either completely or partially around the apertures 26 and openings 30. Also, the entrances to the apertures and openings may be beveled at an angle instead of curved or rounded to enlarge the size and area thereof and extend continuously at an angle or radius of curvature from the enlarged entrances to either the exits, or to narrower or narrowest parts of the passages located downstream from their entrances.

A comparison of the flow capacity, pressure drop and strength has been made between the multibeam support plate of the invention and a prior art model 804-R2 metal multibeam support plate of comparable size, material, and percent of open area disclosed in the above mentioned Bulletin TA 70, hereinafter referred to as a model 804.

The model 804 support plate is made up of six (6) parallel beams about $11\frac{3}{4}$ inches (29.8 cm) from center to center. The beams are $11\frac{3}{8}$ inches (28.9 cm) wide, fabricated from 0.0625 inch (1.58 mm or 0.00158 m) thick sheet metal and spaced 0.375 inches (9.52 mm) apart. Each of the twelve (12) inclined walls have five (5) rows of $\frac{5}{8} \times 1\frac{5}{8}$ inches (1.58 cm × 4.12 cm) elongated or abround slots in a staggered pattern. Center to center the slots are spaced 1.750 inches (4.44 cm) along the incline and $\frac{7}{8}$ inches (2.222 cm) horizontally which provides an incline perforated section of about $8\frac{5}{8}$ inches (21.9 cm) wide along the incline by the length of the beam. There is a single row of $\frac{5}{8} \times 1\frac{5}{8}$ (1.58 cm × 4.12 cm) abround or elongated slots in each horizontal wall spaced $\frac{7}{8}$ inches center to center. The total open area provided in the inclined walls is about 88.7% of the cross-sectional area of the tower chamber.

For comparison the support plate of the invention has the same percent of open area in the inclined walls and horizontal walls as the 804. However, it differs in that it has a single row of abround or elongated slots about $\frac{5}{8}$ inches × 10.473 inches long (1.587 cm × 26.6 cm) spaced $1\frac{1}{4}$ inches (3.17 cm) center to center in the inclined perforated section of each inclined wall. The abround slots or apertures in both the incline and horizontal walls have flanges around them. Each flange has an inner smoothly curved surface with a maximum radius of about 0.3125 inches (7.93 mm) which extends from the entrance to a straight portion about 0.091 inches (2.3 mm) long adjoining the exit of the slot or aperture. Thus, the flange and aperture or slot have a total depth of about 0.4035 inches (10.2 mm) in between the entrance and exit and, less the wall thickness, project about 0.342 inches (8.7 mm or 0.0087 m) beyond the adjacent surface of the wall.

In comparing the reduced resistance to flow through rounded flanged slots in the support plate of the invention with the straight slots in the model 804, one merely has to refer to a suitable engineering handbook such as one entitled "Handbook of Hydraulic Resistance Coefficients of Local Resistance and of Friction" by I. E. IDEL'CHIK, 1960, distributed by (NTIS) National Technical Information Service, U.S. Department of Commerce.

The handbook takes the Reynolds number and resistance factors into account and provides relationships for walls having sharp and round or curved edged orifices. When compared they will show that rounded edge orifices or apertures provide an overall lower resistance to flow. These relationships will apply to both the gas and liquid flow through the apertures.

From the information disclosed on pages 81-83, 112, 122, 124 and 143-144, it can be determined that the model 804 plate has a lower Reynolds number of about 600 compared to 750 for the support plate of the invention when based on a mean stream velocity of 10 m/sec and a maximum kinematic viscosity of 400 centistoke. Also, where the Reynolds number is less than $10^5$ and the coefficient of friction is less than 0.1 (which is the case) it can be determined that the support plate of the invention with rounded edges at the entrance to the flange apertures has a lower coefficient of resistance to flow of about 1.37 and one-half that of 2.8 for the model 804 with sharp edge orifices. Thus, it can be concluded that the support plate of the invention offers less resistance to flow than the 804.

In comparison to the 804 the metal support plate of the invention has up to 30% less pressure drop at the same gas flow rate and percent of open area for gas flow. This means that at the same pressure drop and same percent of open area for gas, it will handle up to 20% more gas than the 804 and could handle the same gas flow rate as the 804 with as much as a 9% reduction in size of the apertures and open area for gas.

Regarding strength, a support plate is not only limited by the total load it can support which is its beam strength but also by the unit load which its sidewall can support without collapsing. The metal support plate of the invention made of the same material and thickness with the same amount of open area as the 804 has sidewalls of greater rigidity which can support up to eleven (11) times or 1100% greater unit load than the 804 in cases that are limited by sidewall strength.

Thus, the support plate of the invention with the same thickness sidewall and metal can support a bed of packing elements about 1100% greater in depth than the 804 in cases that are limited by sidewall strength.

Likewise, a comparison of the sidewall strength between the model 804 and the support plate of the invention with flanged apertures can be determined by referring to any suitable engineering handbook such as one entitled "Mechanics of Materials" by F. E. Miller and H. A. Doeringsfield, 1960, published by International Textbook Company. Since both plates are made of the same material, the same thickness and for the same application, the allowable stress would be the same in both cases. It can be shown that Model 804 can only support about 9% of the load that the support plate of the invention with flanged apertures can support.

Preferably, the support plate of the invention has apertures and openings with enlarged entrances of sufficient size, shape and area whereby in use the support plate has a coefficient of resistance to flow of from 1.37 to less than 2.8, at least 5% less resistance to entrance and flow of the counter flowing gas and liquid or fluids through the apertures and openings and at least 5% less pressure drop at the same gas flow rate than the comparable support plate 804 mentioned above having an equal amount of open area in the self supporting sidewall and horizontal wall portions thereof, without flanges about the apertures and openings and more sharply defined non-enlarged entrances to the apertures and openings.

Also the Applicant's support plate has a Reynolds number greater than 600 and on up to 750 at a mean fluid stream velocity of 10 m/sec and a maximum kinematic viscosity of 400 centistoke, and at the same pressure drop will handle at least 5% more gas than the comparable 804 plate with the same amount of open area.

Further, the lower resistance to flow through the apertures and openings is obtained preferably by smoothly curving the inner peripheral surfaces of the flanges so they have a radius of from 25% to 50% the width of the adjoining aperture or opening at the entrances thereto.

Additionally, the flanges are of sufficient length, generally equal to the length or distance around the apertures and openings and project from the sidewall and horizontal wall portions a sufficient depth of from 20 to 60% the normal or minimum width or diameter of the adjoining flanged aperture or opening. As a result the sidewall portions have from 2 to 11 times more strength, rigidity and load carrying capacity than self supporting sidewall portions of the comparable 804 plate with an equal amount of open area and without flanges about the apertures.

What is claimed is:

1. A support plate supporting a relatively heavy bed of packing elements within a chamber of predetermined cross sectional area in a gas-liquid treatment tower adapted to support the support plate comprising a plurality of adjacent sections each spanning a portion of the cross sectional area of the chamber and supported at opposite ends, each section supporting a portion of the heavy bed of packing elements having a top wall portion above an internal chamber situated between spaced relatively thin sidewall portions, including apertures providing a relatively large amount of open area through which gas passes from the internal chamber into the bed of packing elements, extending downwardly from the top wall portion to relatively thin horizontal wall portions, including openings providing a relatively large amount of open area through which a counter flowing liquid passes downwardly from the heavy bed of packing elements which would normally impose a load sufficient to bend conventional relatively thin perforated sidewall portions, wherein the improvement comprises:

primary flanges, including inner peripheral surface extending around and between enlarged entrances and more sharply defined exits of longitudinally spaced elongated apertures of predetermined width and length extending lengthwise a major part of the width of the sidewall portions between the top wall and horizontal wall portions, and the inner peripheral surfaces are curved to a radius of at least 25% the width of the adjoining aperture from adjacent inner surfaces of the sidewall portions at the enlarged entrances, said flanges extending the length of the apertures therein and projecting from the sidwall portions a depth of at least 20% the width of the apertures, and wherein the sidewall portions have at least two (2) times more strength, rigidity and load carrying capacity than relatively thin self supporting sidewall portions of a comparable support plate with an equal amount of open area therein and without enlarged entrances and flanges about the apertures, the more sharply defined exits increase the resistance to entrance of the fluid from the exits and simultaneous flow of the counter flowing liquid and gas through the same elongated apertures and the enlarged entrances are of sufficient size and shape and area to reduce the resistance to gas flow whereby the support plate in use has at least 5% less pressure drop at the same gas flow rate and can handle at least 5% greater volume of gas at the same pressure drop than the comparable support plate.

2. A support plate according to claim 1 wherein each section further comprises:

secondary flanges, including inner peripheral surfaces, extending around and between enlarged entrances and more sharply defined exits of openings of predetermined width in the horizontal wall portions and from the horizontal wall portions a depth of at least 20% the width of the openings, and the inner peripheral surfaces of the secondary flanges are curved to a radius of at least 25% the width of the adjoining opening from adjacent upper surfaces of the horizontal wall portions at the enlarged entrances to the openings whereby the horizontal wall portions have more strength, rigidity and load carrying capacity than relatively thin horizontal wall portions of a comparable support plate with an equal amount of open area therein and without enlarged entrances and flanges about the openings, and wherein the enlarged entrances are of sufficient size, shape and area to reduce the resistance to entrance flow of the counter flowing liquid through the openings at least 5% less than that of the comparable support plate and the more sharply defined exits increased the resistance to entrance of gas and simultaneous flow of the counter flowing gas and liquid through the same openings.

* * * * *